United States Patent
Bae et al.

(10) Patent No.: US 8,367,262 B2
(45) Date of Patent: Feb. 5, 2013

(54) HEAT CONTROLLABLE VISUALIZATION APPARATUS FOR TRANSPARENT PEMFC

(75) Inventors: Joongmyeon Bae, Daejeon (KR);
Dong-ryul Lee, Hwaseong-si (KR);
Kwang-Jin Park, Seoul (KR)

(73) Assignee: Korea Advanced Institute of Science and Technology, Daejon (KR)

( * ) Notice: Subject to any disclaimer, the term of this patent is extended or adjusted under 35 U.S.C. 154(b) by 274 days.

(21) Appl. No.: 12/917,786

(22) Filed: Nov. 2, 2010

(65) Prior Publication Data

US 2011/0104581 A1    May 5, 2011

(30) Foreign Application Priority Data

Nov. 4, 2009 (KR) .................. 10-2009-0105720

(51) Int. Cl.
*H01M 8/04* (2006.01)
(52) U.S. Cl. ........................... 429/434; 429/433
(58) Field of Classification Search .............. 429/434
See application file for complete search history.

(56) References Cited

PUBLICATIONS

Wang, C., "Electrochemical and flow characterization of a direct methanol fuel cell", May 18, 2004, Elsevier, Journal of Power Sources, vol. 134, pp. 33-40.*

\* cited by examiner

*Primary Examiner* — Patrick Ryan
*Assistant Examiner* — Brent Thomas
(74) *Attorney, Agent, or Firm* — The Webb Law Firm

(57) ABSTRACT

Provided is a visualization apparatus for a transparent PEMFC using a transparent window having conditions approximating a real PEMFC. More specifically, the present invention includes a heat-exchange passage heat exchanging a transparent plate of a visualization apparatus with a current collector plate in order to control heat. In order to achieve the above object, the present invention includes: current collector plates each provided at both surfaces of a membrane electrode assembly of a fuel cell and formed with a channel in which reaction gas and products flow; transparent plates provided at an outer surface of the current collector plates and provided with a heat-exchange passage having a fluid flowing therein to be heat-exchanged with the current collector plates; and fixing frames having a visualization window for observing the current collector plates and provided at the outer side of the transparent plates.

3 Claims, 7 Drawing Sheets

[FIG. 1]
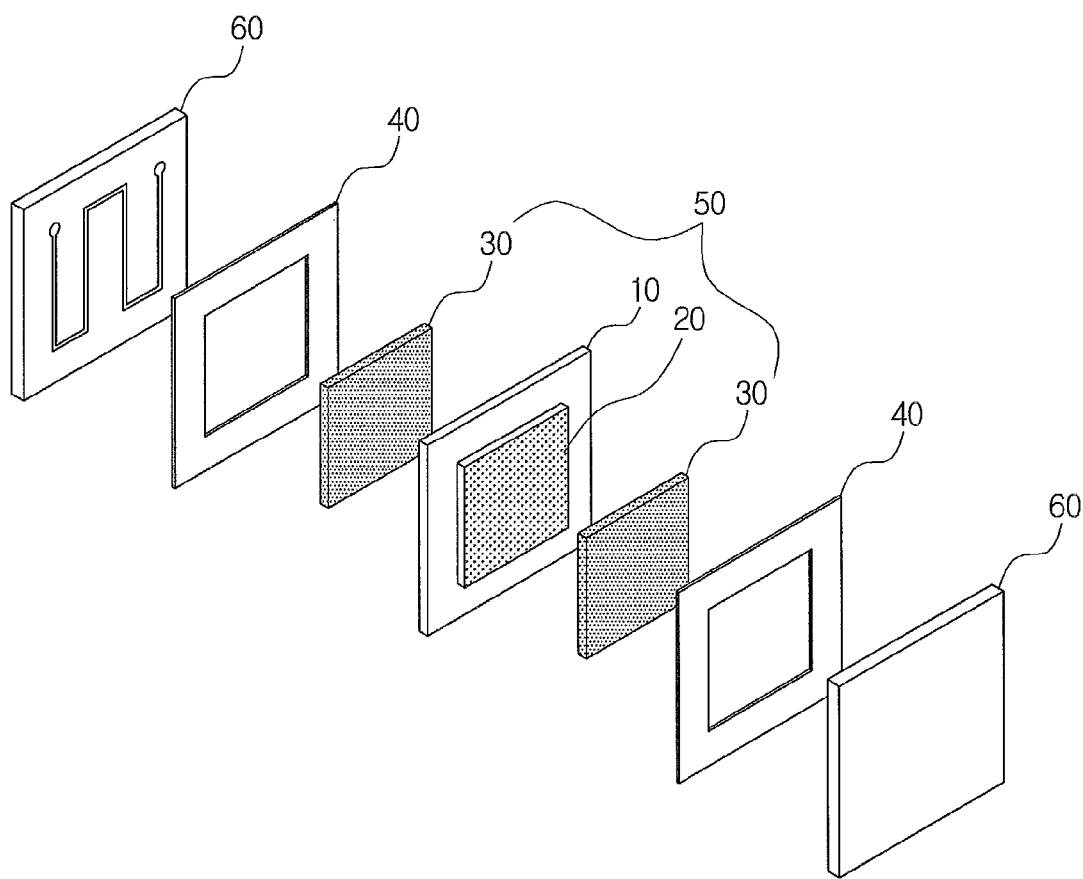

[FIG. 2]
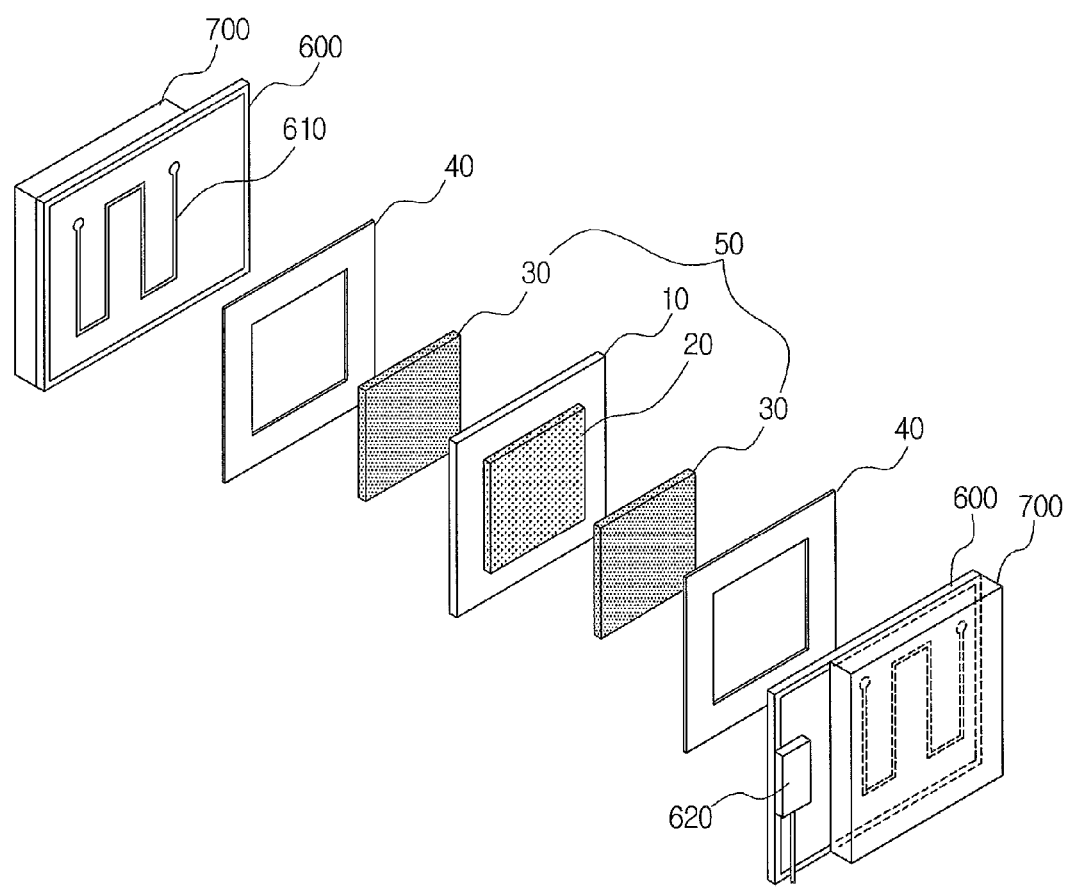

[FIG. 3]
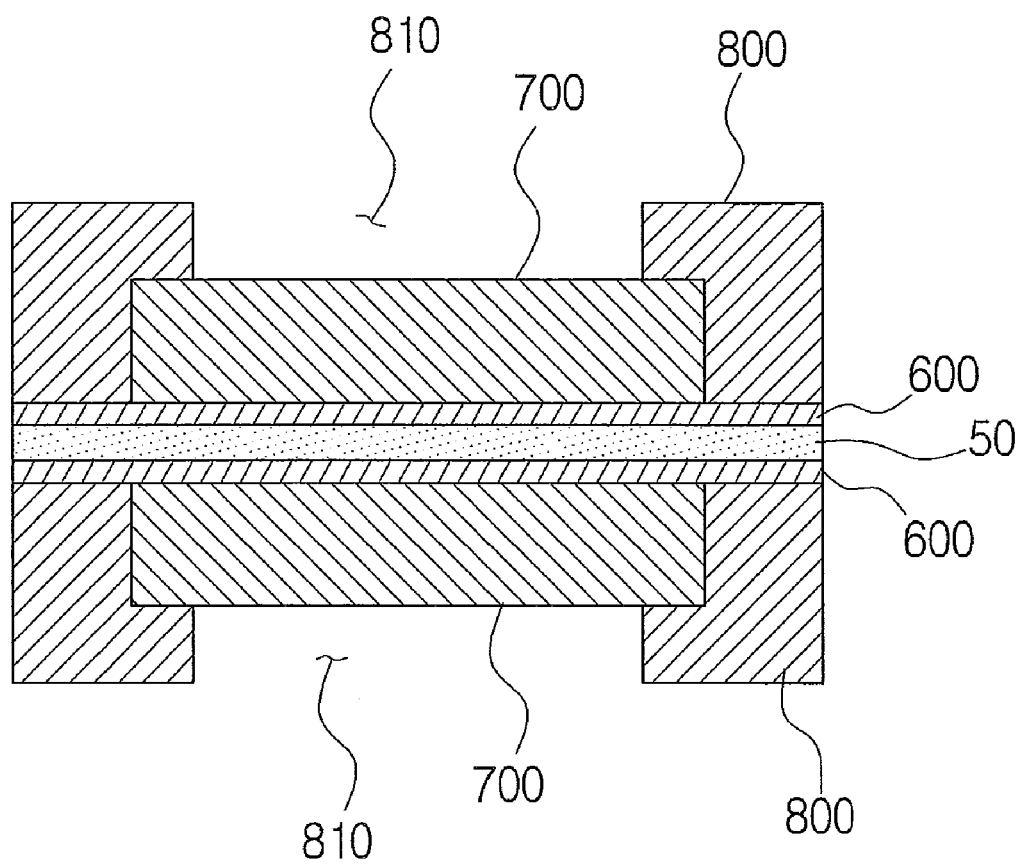

[FIG. 4]
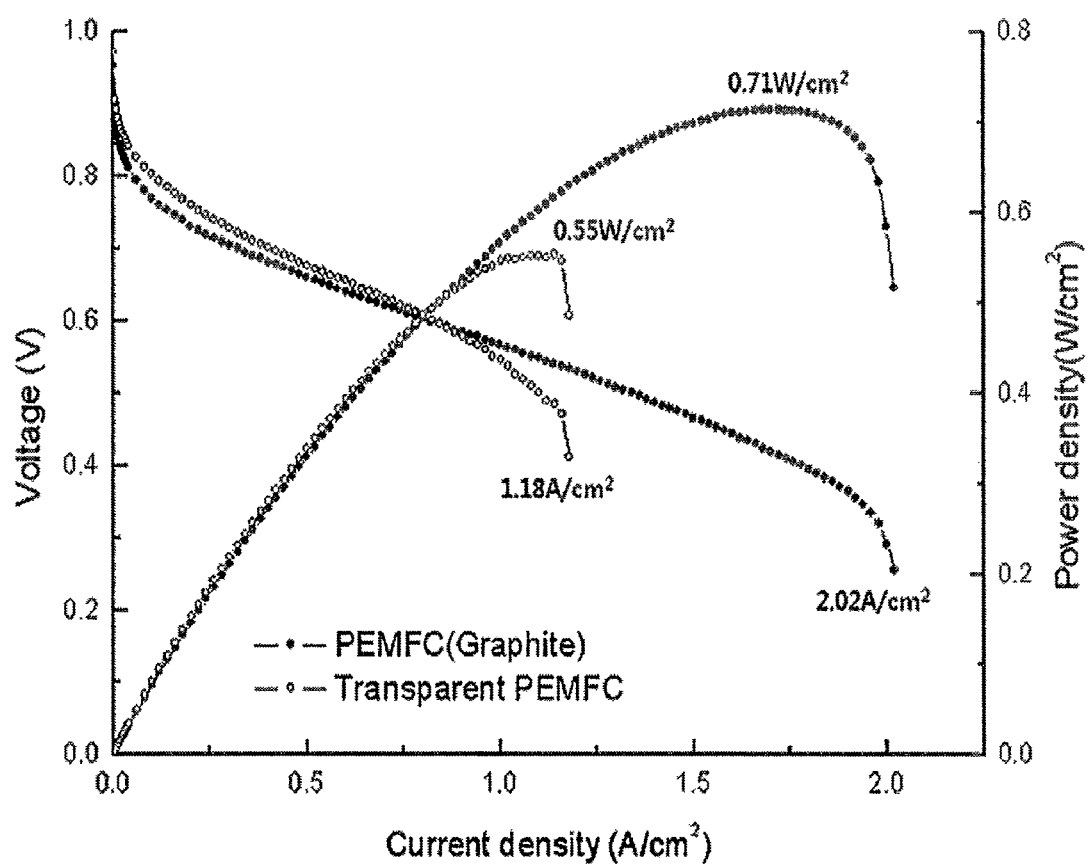

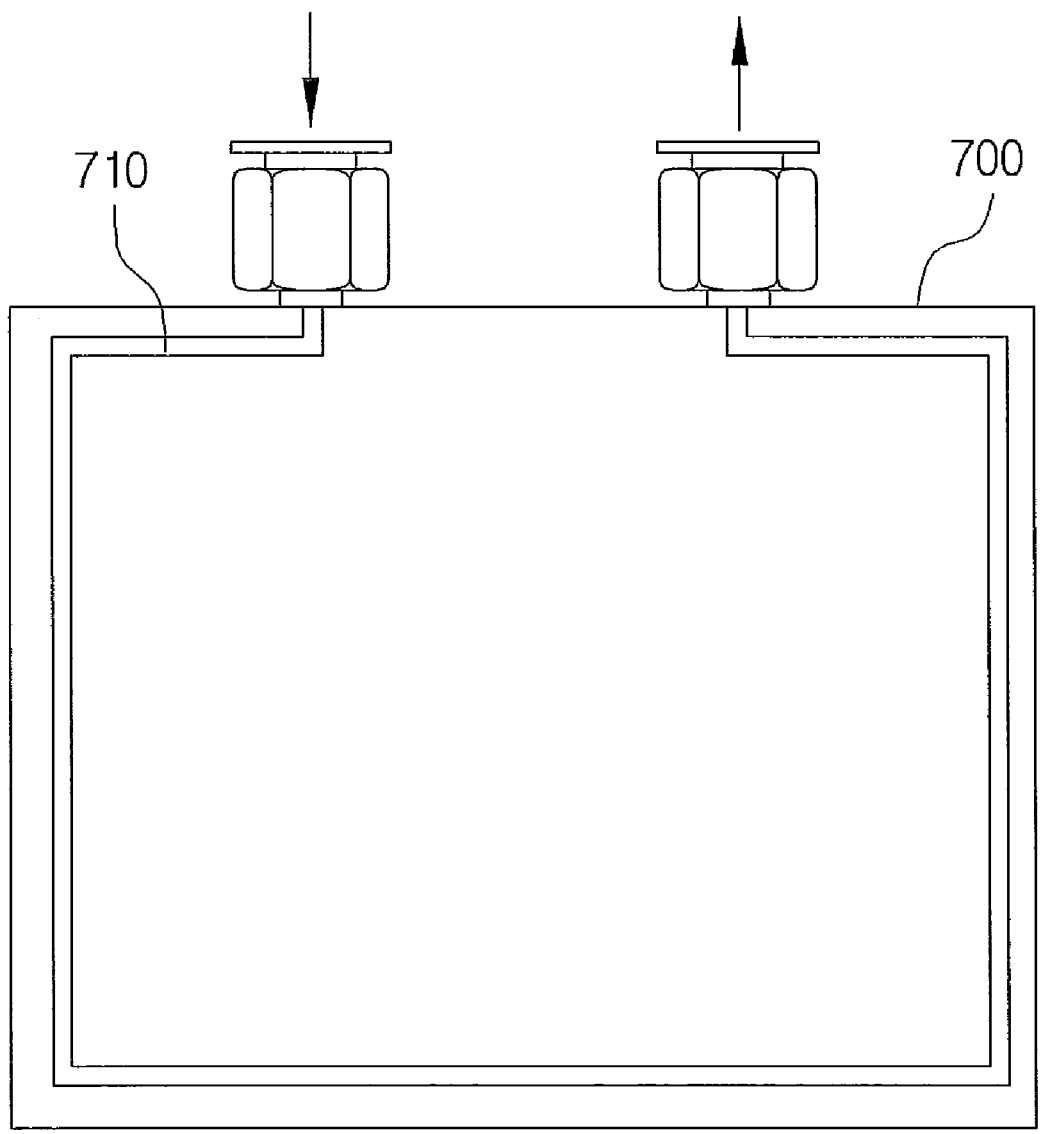
[FIG. 5]

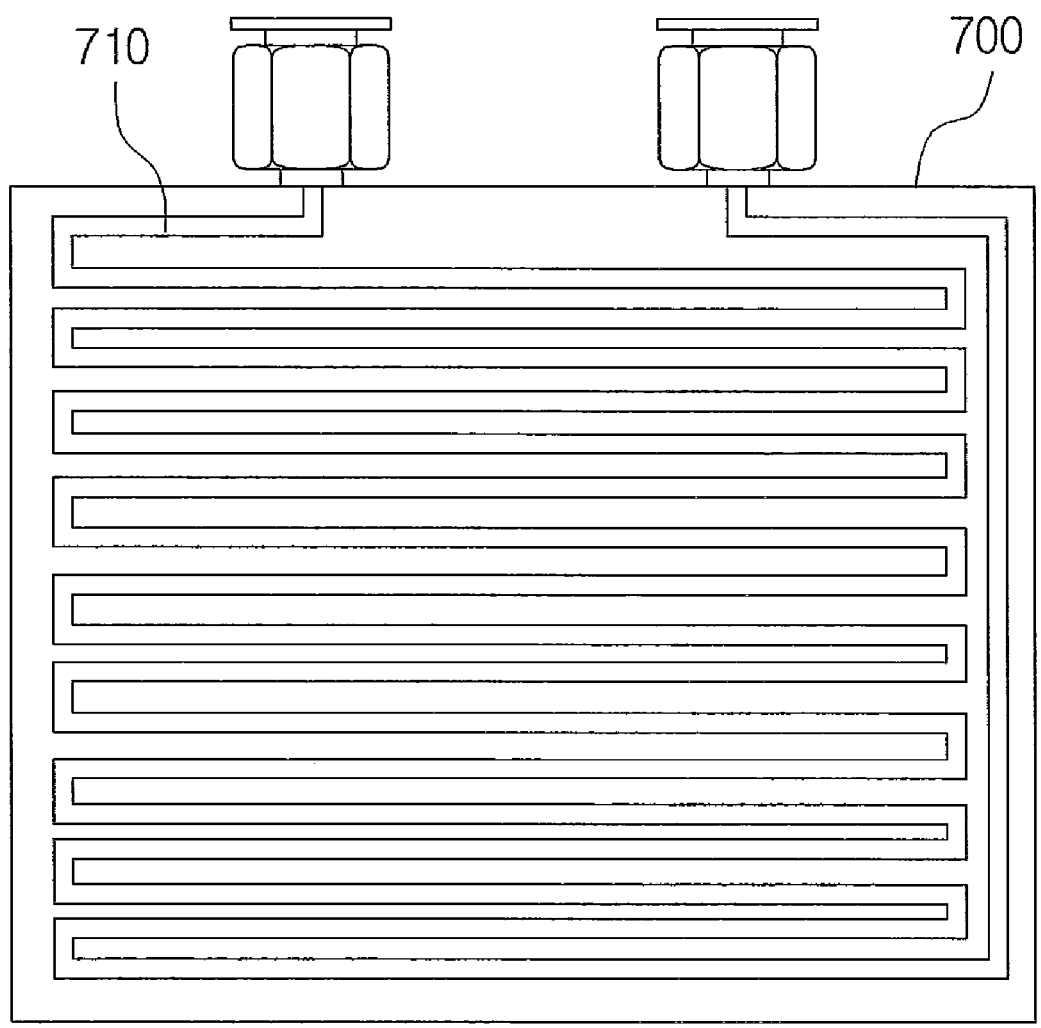
[FIG. 6]

[FIG. 7]
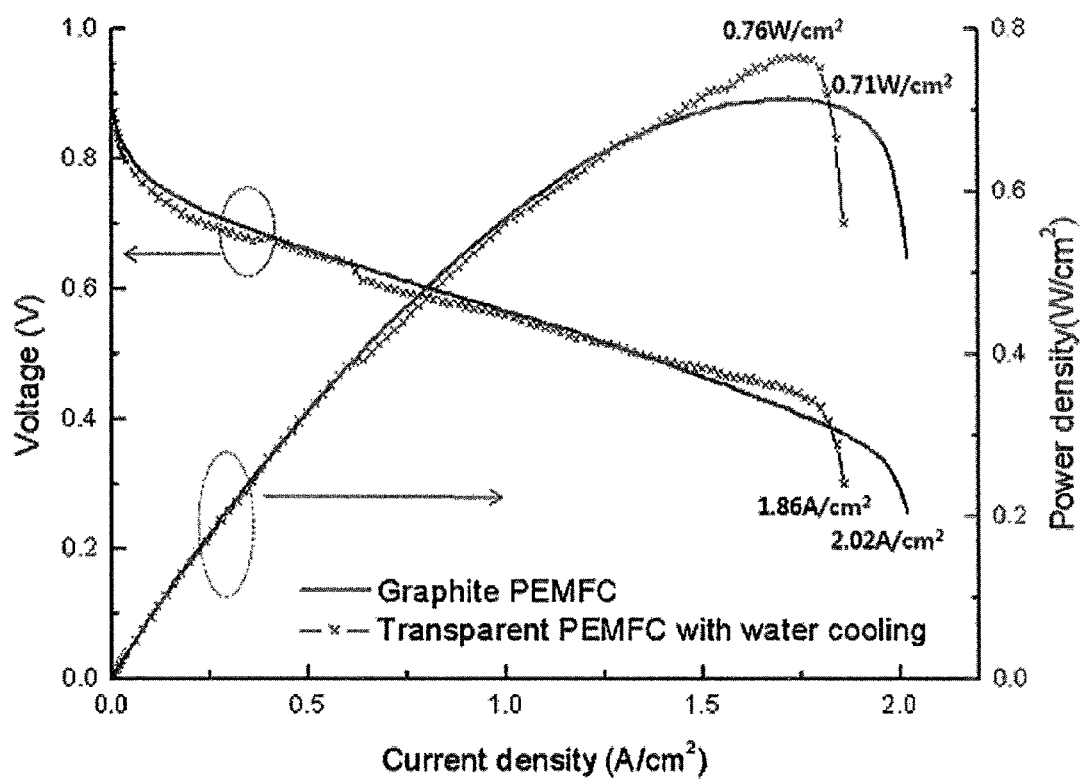

HEAT CONTROLLABLE VISUALIZATION APPARATUS FOR TRANSPARENT PEMFC

TECHNICAL FIELD

The present invention relates to a visualization apparatus for a transparent PEMFC using a transparent window, and more particularly, to a visualization apparatus for a transparent PEMFC including a heat-exchange passage, which heat-exchanges a transparent plate of the visualization apparatus for a transparent PEMFC with a current collector plate, in order to control heat, such that it can have conditions approximating a real PEMFC.

BACKGROUND ART

As environmental regulations of automobile markets are increasingly tightened, the world's carmakers have tried to develop environment-friendly and high-efficient cars. It is expected that the fuel-cell car will emerge as the center focus of an automobile market in the future because it is environmentally friendly in that it only discharges water while having high efficiency. As a result, many carmakers have continued to develop a fuel-cell car. A demand for a fuel-cell technology has continuously increased in the industrial world and the academic world. Therefore, research into a fuel cell for a car, for example, a proton exchange membrane fuel cell (PEMFC), has been actively conducted.

An operating temperature of a general PEMFC shown in FIG. 1 is less than 100° C. This occurs when water is generated due to the reaction of hydrogen with oxygen, which is a liquid phase. When the liquid phase water is discharged while flowing in a fuel cell channel along with air, this is called a flooding phenomenon. The flooding phenomenon has been known as one of the main factors that degrade PEMFC performance. However, since it is difficult to visualize a two-phase flow in the PEMFC channel, research into the flooding has been mainly conducted through interpretation using a CFD.

In addition to the CFD, a method of observing the flooding by visualizing the two-phase flow in the PEMFC channel has been used. As an example, there is a method of observing the flooding in the PEMFC channel by using a neutron beam. Even though there is no need to change the components of the PEMFC in order to observe the behavior of water using the neutron beam, and reliability is at the highest, an apparatus generating the neutron beam is very expensive. In addition, it is difficult to specifically know how water is discharged since processing the image data is complex and the interface of water with air is unclear. In addition, since the image using the neutron beam is implemented in a two-dimensional plane, it is difficult to know whether or not water is presented in an anode or a cathode state.

Therefore, researchers in and outside the country have mainly used a visualization method using a transparent window. The method can directly visualize the two-phase flow within the channel, such that it can specifically observe the shape where water flows. However, unlike the real PEMFC, since a visualization apparatus using the visualization method uses a current collector plate 600 in which a passage is formed on a metal plate having a thickness of about 1 mm as shown in FIG. 2, instead of using a separator 60 shown in FIG. 1 in order to perform visualization, it has a larger possibility of distorting the two-phase flow within a channel 610, as compared to the real PEMFC. Therefore, it is very important to secure the reliability by comparing an I-V characteristic curve between the real PEMFC and the visualization apparatus.

Generally, as shown in FIGS. 2 and 3, the visualization apparatus includes transparent plates 700 at the outer sides of the current collector plates 600 and large visualization windows 810 and 820 fixed on fixing frames 800 by being pressurized to the fixing frames 800 at the outermost sides of the visualization apparatus. The visualization apparatus observes the channels 610 of the current collector plates 600 through the large visualization windows. However, the result of the experiment show that in the real PEMFC using graphite as shown in FIG. 4, a maximum current density is 0.71 W/cm$^2$, but in the visualization apparatus, a maximum current density is only 0.55 W/cm$^2$ under the same conditions. In particular, in the fuel cell, the maximum current density is 2.02 A/cm$^2$ but in the visualization apparatus, the maximum current density does not exceed 1.2 A/cm$^2$. This implies that the flow phenomenon of the visualization apparatus is different from the phenomenon shown in the real PEMFC to cause the problem in reliability.

In particular, this problem is caused by the heat control due to the use of the thin current collector plate 600 of about 1 mm having a large heat resistance unlike the separator of the real PEMFC. That is, even though the current collector plate includes a heater 620, this is insufficient to control heat. Therefore, it is difficult to keep the operating temperature in a low current area, supply heat from an external heat source, and discharge the heat of reaction in a high current area.

DISCLOSURE

[Technical Problem]

An object of the present invention is to provide a visualization apparatus for a transparent PEMFC using a transparent window having conditions approximating a real PEMFC. In particular, the transparent plate of the visualization apparatus for a transparent PEMFC includes a heat-exchange passage having a fluid flowing therein and controlling the temperature of the visualization apparatus for a transparent PEMFC in order to control heat, such that the visualization apparatus for a transparent PEMFC has the operating conditions approximating the real PEMFC.

[Technical Solution]

In one general aspect, a heat controllable visualization apparatus for a transparent PEMFC includes: current collector plates each provided at both surfaces of a membrane electrode assembly of a fuel cell and formed with a channel in which reaction gas and products flow; transparent plates provided at an outer surface of the current collector plates and provided with a heat-exchange passage having a fluid flowing therein to be heat-exchanged with the current collector plates; and fixing frames having a visualization window for observing the current collector plates and provided at the outer side of the transparent plates.

The heat-exchange passage may be provided with a groove formed on a surface contacting the current collector plate.

The temperature of the fluid supplied to the heat-exchange passage may be automatically controlled according to a temperature measuring result of the current collector plate.

Advantageous Effects

According to the present invention, the visualization apparatus for a transparent PEMFC forms the heat-exchange passage on the transparent plate to heat-exchange the transparent plate with the current collector plate to which heat is not transferred well in the related art, thereby making it possible for the visualization apparatus to control heat.

In addition, the present invention forms the flow conditions approximating the real PEMFC, thereby making it possible to increase the reliability of the visualization apparatus.

DESCRIPTION OF DRAWINGS

The above and other objects, features and advantages of the present invention will become apparent from the following description of preferred embodiments given in conjunction with the accompanying drawings, in which:

FIG. 1 is an exploded view of a real PEMFC;

FIG. 2 is an exploded view of a visualization apparatus for a transparent PEMFC according to the related art;

FIG. 3 is a cross-sectional view of the visualization apparatus of FIG. 2;

FIG. 4 is a graph comparing an I-V characteristic curve between the visualization apparatus of FIG. 3 and the real PEMFC;

FIG. 5 shows a shape of a transparent plate of a visualization apparatus of a fuel cell according to the present invention;

FIG. 6 shows another shape of a transparent plate of a visualization apparatus of a fuel cell according to the present invention; and FIG. 7 is a graph comparing an I-V characteristic curve between the visualization apparatus according to the present invention and the real PEMFC.

DETAILED DESCRIPTION OF MAIN ELEMENTS

10: Polymer electrolyte membrane
20: Catalyst layer
30: Gas diffusion layer
40: Gasket
50: Membrane electrode assembly
60: Separator
600: Current collector plate
610: Channel
620: Heater
700: Transparent plate
710: Heat-exchange passage
800: Fixing frame
810: Visualization window

[Best Mode]

A visualization apparatus for a transparent PEMFC according to the present invention will be described in detail below with reference to the accompanying drawings.

FIG. 3 is a cross-sectional view of a visualization apparatus for a transparent PEMFC and FIG. 4 is a graph comparing an I-V characteristic curve between the visualization apparatus of FIG. 3 and a real PEMFC.

FIGS. 5 and 6 each show a transparent plate of the visualization apparatus for a transparent PEMFC according to the present invention and FIG. 7 is a graph comparing an I-V characteristic curve between the visualization apparatus for a transparent PEMFC according to the present invention with the real PEMFC.

Unlike a real PEMFC, as shown in FIG. 3, the visualization apparatus for a transparent PEMFC according to the present invention includes current collector plates 600 formed with channels 610 in which reaction gas and products flow, instead of a separator 60 provided at both surfaces of a membrane electrode assembly 50 of a fuel cell that includes a polymer electrolyte membrane 10, a catalyst layer 20, and a gas diffusing layer 30, having a gasket 40 between both surfaces thereof, transparent plates 700 provided at the outer surfaces of the current collector plates 600, and fixing frames 800 having visualization windows 810 for observing the current collector plates 600 formed thereon and provided at the outer sides of the transparent plates 700.

The current collector plate 600 is composed of a metal plate having a thickness of about 1 mm and is provided with the channel 610 corresponding to a passage for reaction gas and products. The passage of the current collector plate 600 is visually observed through the visualization apparatus for a transparent PEMFC.

The transparent plate 700 is configured to cover the outer surface of the current collector plate 600 and is made of a transparent material (polycarbonate, or the like) in order to observe a two-phase flow within the channel 610.

The fixing frames 800 are provided at both the outermost sides of the visualization apparatus and are pressurized, such that the components of the visualization apparatus for a transparent PEMFC according to the present invention are assembled to be closely attached to each other. Meanwhile, the fixing frames 800 are provided with a visualization window 810 penetrating through the central portion of the fixing frames 800 in order to observe the passage through the transparent plate 700.

The visualization apparatus for a transparent PEMFC according to the present invention including the above-mentioned components can control heat. In order to control heat, a fluid flows into the transparent plate 700 which is provided with a heat-exchange passage 710 to be heat-exchanged with the current collector plate 600, as shown in FIGS. 5 and 6.

The visualization apparatus for a transparent PEMFC according to the present invention forms the heat-exchange passage 710 on the transparent plate 700 contacting the thin current collector plate 600 to be heat-exchanged with the current collector plate 600, without directly transferring heat using a heater 620, or the like, as in the related art. For the heat exchange, in the case of a water cooling manner, water is the most preferable as the fluid flowing into the heat-exchange passage 710; however, the type of fluid is not limited.

Meanwhile, the position of the heat-exchange passage 710 provided on the transparent plate 700 is not limited, but as shown in FIG. 5, a surface contacting the current collector plate 600 may be formed with a groove. In this case, it is preferable to form the heat-exchange passage 710 so as not to generate interference with the channel 610 that may be formed on the current collector plate 600 or on the transparent plate 700. FIG. 5 shows that the heat-exchange passage 710 is formed at the outside so as to avoid a portion contacting the channel 610.

On the other hand, the heat-exchange passage 710 may be formed in the transparent plate 700 so that heat can be transferred by the transparent plate 700 even though the heat-exchange passage 710 does not directly contact the current collector plate 600. That is, two transparent plates 700 are stacked and the heat-exchange passage 710 is formed between the stacked surfaces, thereby making it possible to control heat. In this case, the heat-exchange passage 710 can be freely formed without being affected by the position or shape of the reaction gas channel 610. FIG. 6 shows that the heat-exchange passage 710 is formed on one surface of two stacked transparent plates 700.

According to the present invention, the heat-exchange passage 710 mainly serves as a cooling unit but can also serve as a heating function to increase temperature during a low-temperature starting condition or a low current area, etc., such that it can synthetically perform the heat control of the visualization apparatus for a transparent PEMFC.

In addition, when the temperature of the fluid supplied to the heat exchange passage 710 is automatically controlled according to the temperature measuring result of the current collector plate 600, the desired observation conditions can be easily formed according to the set conditions.

It can be appreciated from FIG. 7 that the I-V characteristic curve using the heat controllable visualization apparatus for a transparent PEMFC according to the present invention is very similar to the I-V characteristic curve of the real PEMFC, which implies that the observation result through the visualization apparatus is reliably considered.

The present invention is not limited to the embodiment described herein and it should be understood that the present invention may be modified and changed in various ways without departing from the spirit and the scope of the present invention. Therefore, it should be appreciated that the modifications and changes are included in the claims of the present invention.

The invention claimed is:

1. A heat controllable visualization apparatus for a transparent PEMFC, comprising:
   current collector plates (600) each provided at both surfaces of a membrane electrode assembly (50) of a fuel cell and formed with a channel (610) in which reaction gas and products flow;
   transparent plates (700) provided at an outer surface of the current collector plates (600) and provided with a heat-exchange passage (710) having a fluid flowing therein to be heat-exchanged with the current collector plates (600); and
   fixing frames (800) having a visualization window (810) for observing the current collector plates (600) and provided at the outer side of the transparent plates (700).

2. The heat controllable visualization apparatus for a transparent PEMFC of claim 1, wherein the heat-exchange passage (710) is provided with a groove formed on a surface contacting the current collector plate (600).

3. The heat controllable visualization apparatus for a transparent PEMFC of claim 2, wherein the temperature of the fluid supplied to the heat-exchange passage (710) is automatically controlled according to a temperature measuring result of the current collector plate (600).

* * * * *